United States Patent
Dunjic et al.

(10) Patent No.: US 11,843,702 B2
(45) Date of Patent: Dec. 12, 2023

(54) SYSTEM AND METHOD FOR SECURE DISTRIBUTION OF RESOURCE TRANSFER REQUEST DATA

(71) Applicant: The Toronto-Dominion Bank, Toronto (CA)

(72) Inventors: Milos Dunjic, Oakville (CA); Asad Joheb, Toronto (CA); David Samuel Tax, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 239 days.

(21) Appl. No.: 16/953,724

(22) Filed: Nov. 20, 2020

(65) Prior Publication Data

US 2022/0166629 A1    May 26, 2022

(51) Int. Cl.
*H04L 9/40* (2022.01)
*H04L 9/32* (2006.01)
*G06F 9/50* (2006.01)

(52) U.S. Cl.
CPC .......... *H04L 9/3247* (2013.01); *G06F 9/5011* (2013.01)

(58) Field of Classification Search
CPC .............................. H04L 9/3247; G06F 9/5011
See application file for complete search history.

(56) References Cited

U.S. PATENT DOCUMENTS

| | | | |
|---|---|---|---|
| 6,772,341 B1* | 8/2004 | Shrader | G06F 21/64 380/28 |
| 7,236,957 B2 | 6/2007 | Crosson Smith | |
| 9,514,458 B2 | 12/2016 | Rutherford et al. | |
| 10,102,521 B2 | 10/2018 | Fung et al. | |
| 10,540,640 B1* | 1/2020 | James | H04L 9/3239 |
| 10,607,212 B2* | 3/2020 | Sheets | G06Q 20/326 |
| 10,846,679 B2* | 11/2020 | Oliynyk | G06Q 20/325 |
| 11,088,826 B2* | 8/2021 | Kandiraju | H04L 9/3263 |
| 11,270,279 B1* | 3/2022 | Rozovski | G06Q 20/14 |
| 11,354,660 B1* | 6/2022 | Griffin | G06Q 20/401 |
| 11,593,773 B1* | 2/2023 | Yip | G06Q 20/4015 |
| 2005/0177495 A1* | 8/2005 | Crosson Smith | G06Q 40/02 705/39 |
| 2008/0155260 A1* | 6/2008 | Perez | H04L 9/3263 713/169 |
| 2009/0106557 A1* | 4/2009 | Leonard | H04L 63/12 713/176 |
| 2012/0030098 A1* | 2/2012 | Bulawa | G06Q 20/401 705/40 |
| 2013/0185209 A1* | 7/2013 | Ahn | G06Q 20/385 705/44 |

(Continued)

*Primary Examiner* — Ghodrat Jamshidi
(74) *Attorney, Agent, or Firm* — Rowand LLP

(57) ABSTRACT

A processor-implemented method is disclosed. The method includes: generating a secure data object associated with a request for transfer of resources, the secure data object indicating one or more resource transfer parameters including account information for a transferee account at a resource account management system, wherein the secure data object includes a first hash computed based on the one or more resource transfer parameters; signing the secure data object using a private key associated with the resource account management system; and sending the secure data object to a messaging address associated with a transferor of the requested resources.

20 Claims, 7 Drawing Sheets

(56) References Cited

U.S. PATENT DOCUMENTS

| | | | |
|---|---|---|---|
| 2013/0290187 A1* | 10/2013 | Itwaru | G06Q 20/3227 |
| | | | 705/44 |
| 2014/0280187 A1* | 9/2014 | Molaro | G06F 16/278 |
| | | | 707/741 |
| 2014/0379584 A1 | 12/2014 | Ward | |
| 2016/0125369 A1* | 5/2016 | Grassadonia | G06Q 20/386 |
| | | | 705/44 |
| 2016/0342985 A1* | 11/2016 | Thomas | G06Q 20/027 |
| 2018/0336553 A1* | 11/2018 | Brudnicki | G06Q 20/385 |
| 2018/0365691 A1* | 12/2018 | Sanders | G06Q 20/065 |
| 2019/0095907 A1* | 3/2019 | Govindarajan | G06Q 20/382 |
| 2019/0199691 A1 | 6/2019 | Garrett et al. | |
| 2020/0336294 A1* | 10/2020 | Sun | H04L 9/0637 |
| 2020/0349663 A1* | 11/2020 | Quadros | G06F 16/951 |
| 2021/0133736 A1* | 5/2021 | Kavanagh | G06Q 20/3825 |
| 2022/0067824 A1* | 3/2022 | Honeywell | G06Q 30/016 |
| 2022/0129887 A1* | 4/2022 | Wright | G06Q 20/3827 |

* cited by examiner

SYSTEM AND METHOD FOR SECURE DISTRIBUTION OF RESOURCE TRANSFER REQUEST DATA

TECHNICAL FIELD

The present application relates to data security and, more particularly, to systems and methods for securely distributing and validating transfer request data in connection with real-time transfer of resources in a networked environment.

BACKGROUND

Resources may be transferred between computing systems of a network. For example, computing resources, such as processing units, memory, etc., may be transferred between nodes of a network in order to attain a desired distribution of resources for the network. As a further example, electronic transfers of data between computing systems may effect changes to the quantum of resources that are associated with the computing systems.

Requests for transfer of resources may be directed to a central computing system that processes and handles such requests. By way of example, a server computer that manages a plurality of resource accounts may handle requests to share, distribute, or otherwise transfer resources that are associated with the accounts. For these systems, requests for real-time (or near real-time) transfer of resources may pose a number of challenges. Any errors or delays which may be introduced in processing of requests for real-time transfers can cause subsequent processes and actions by the intended recipients of the transfers to be delayed or to fail entirely. Additionally, the speed at which such transfers are conducted may increase the risk of errors and/or security attacks. For example, real-time transfers may not be subjected to comprehensive security checks that are intended to verify the identity of recipients of the transfers. In the absence of proper security measures, the resources that are transferred may be exposed to access attacks by unauthorized parties.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
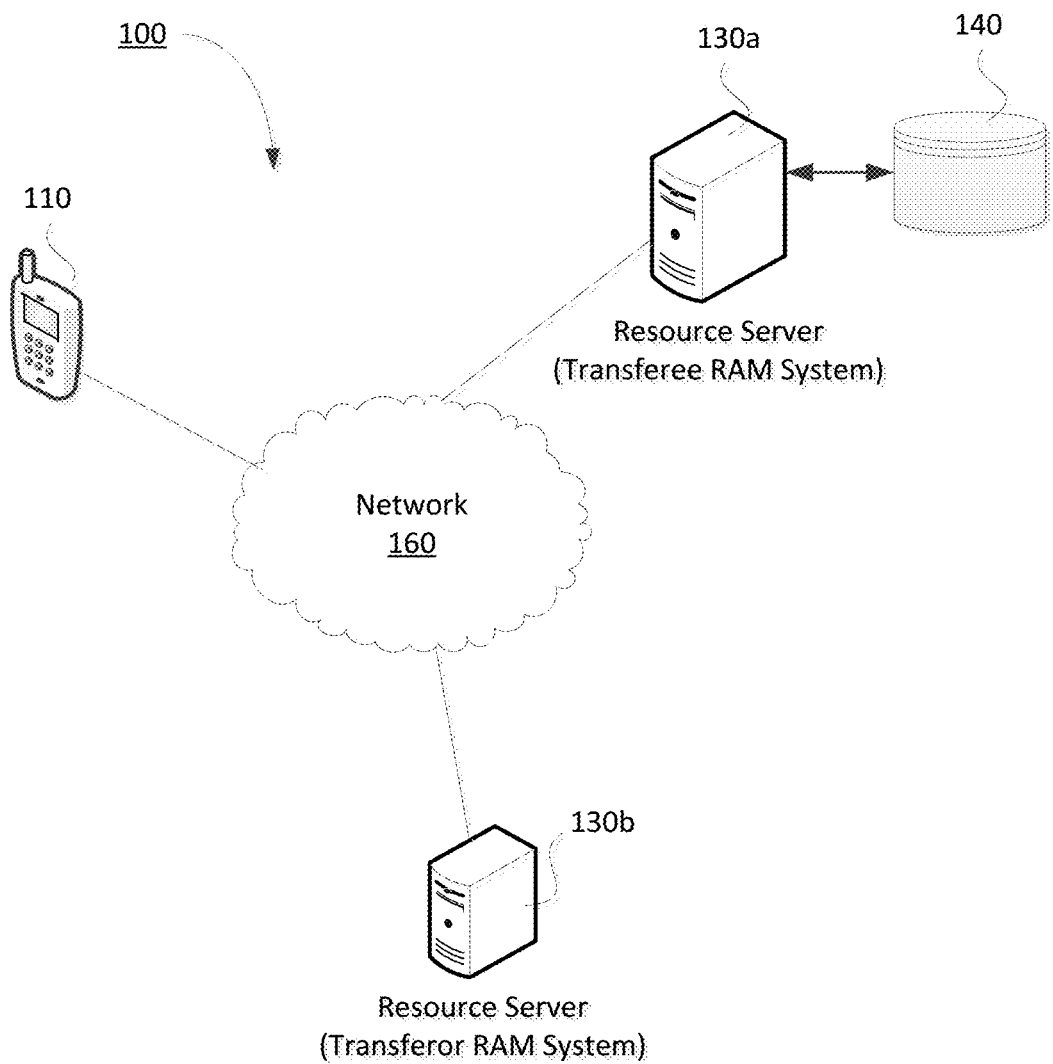
FIG. 1 is a schematic diagram illustrating an operating environment of an example embodiment.

In an aspect, the present disclosure describes a computing device. The computing device includes a processor, a communications module coupled to the processor, and a memory coupled to the processor. The memory stores instructions that, when executed, configure the processor to: generate a secure data object associated with a request for transfer of resources, the secure data object indicating one or more resource transfer parameters including account information for a transferee account at a resource account management system, wherein the secure data object includes a first hash computed based on the one or more resource transfer parameters; sign the secure data object using a private key associated with the resource account management system; and send the secure data object to a messaging address associated with a transferor of the requested resources.

In some implementations, the instructions may further configure the processor to: validate the secure data object by: verifying that a signature associated with the secure data object is valid using a public key corresponding to the private key associated with the resource account management system; and computing a second hash based on the one or more resource transfer parameters included in the secure data object and comparing the second hash to the first hash to confirm that the one or more resource transfer parameters have not been modified after the signing.

In some implementations, the secure data object may include a unique identifier and wherein the first hash is computed based, in part, on the unique identifier.

In some implementations, validating the secure data object may further include confirming that the unique identifier has not been used previously.

In some implementations, confirming that the unique identifier has not been used previously may include sending a request to the resource account management system to confirm that no resource transfers to accounts at the resource account management system have been processed using the unique identifier.

In some implementations, generating the secure data object may include obtaining the account information for the transferee account directly from the resource account management system.

In some implementations, the instructions may further configure the processor to, after verifying that the signature associated with the secure data object is valid, configure a transfer of the requested resources to the transferee account identified by the account information using a real-time resource transfer rail.

In some implementations, the secure data object may indicate a quantity of resources associated with the resource transfer and configuring the transfer may include configuring a transfer of the quantity of resources identified in the secure data object.

In some implementations, the secure data object may include a unique identifier and configuring the transfer may include embedding the unique identifier in transfer data associated with the resource transfer.

In some implementations, the instructions may further configure the processor to provide, to a computing device associated with the transferor, identification information for a transferee identified in the secure data object.

In another aspect, the present disclosure describes a processor-implemented method. The method includes: generating a secure data object associated with a request for transfer of resources, the secure data object indicating one or more resource transfer parameters including account information for a transferee account at a resource account management system, wherein the secure data object includes a first hash computed based the one or more resource transfer parameters; signing the secure data object using a private key associated with the resource account management system; and sending the secure data object to a messaging address associated with a transferor of the requested resources.

In yet another aspect, the present disclosure describes a processor-implemented method. The method includes: at a first resource account management: generating a secure data object associated with a request for transfer of resources, the secure data object indicating one or more resource transfer parameters including account information for a transferee account at the first resource account management system, wherein the secure data object includes a first hash computed based on the one or more resource transfer parameters; signing the secure data object using a private key associated with the first resource account management system; and sending the secure data object to a messaging address associated with a transferor of the requested resources; at a second resource account management system: validating the secure data object by: verifying that a signature associated with the secure data object is valid using a public key corresponding to the private key associated with the first resource account management system; and computing a second hash based on the one or more resource transfer parameters included in the secure data object and comparing the second hash to the first hash to confirm that the one or more resource transfer parameters have not been modified after the signing.

Other aspects and features of the present application will be understood by those of ordinary skill in the art from a review of the following description of examples in conjunction with the accompanying figures. Example embodiments of the present application are not limited to any particular operating system, system architecture, mobile device architecture, server architecture, or computer programming language.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "resource transfer request data" refers broadly to data that is included in a request for resources to be transferred from at least one transferor computing system to at least one transferee computing system. A resource transfer request may be generated by a transferee (or "resource requester" as used interchangeably herein), and may include information such as identity of the transferee, a designated resource account associated with the transferee, quantum of resources requested to be transferred, requested time for the transfer, and a unique transfer identifier. The resource transfer request is transmitted to a transferor (or a computing system associated with a transferor) that is identified by the transferee, and transfer of the requested resources may be initiated by the transferor in accordance with the resource transfer request data.

Various types of resources, such as computing resources (e.g. processing units, memory, file storage), data, etc., may be transferred between computing systems in a networked environment. A "real-time" resource transfer provides instantaneous (or near instant) exchange of resources. The speed at which real-time resource transfers are conducted may increase the risk of errors and/or security attacks. For example, real-time resource transfers may not be subjected to comprehensive security checks that are intended to verify the identity of recipients of the transfers. In the absence of suitable security measures, the resources that are transferred may be exposed to access attacks by unauthorized parties. As a specific example, an attacker may purport to be an entity that is trusted by a transferor system and transmit, to the transferor system, a request for resources to be transferred. Without proper verification of the requester identity, the requested resources may be unwittingly transferred to a computing system that is controlled or otherwise associated with an attacker.

The present application provides techniques for secure transfer of resources in a networked environment. More specifically, the present disclosure describes methods for securely distributing and validating resource transfer request data. By protecting resource transfer request data from attacks (e.g. man-in-the-middle attack), resource management systems can ensure that (1) resource transfer requests from unauthorized parties are rejected, and (2) valid resource transfer requests are processed. In particular, the disclosed techniques are designed to minimize the risk of resource transfer requests from trusted parties being modified to requests for transfers in favor of attackers (or otherwise unintended recipients).

The disclosed technology represents improvements in security for resource account management systems and, more particularly, improved security of systems for processing real-time transfers of resources between resource accounts. In particular, the present technology represents improvements over prior resource transfer processing systems which relied, in large part, on requirements of imposed delays, or lags, when processing real-time transfers in order to verify the identity of transferees.

In one aspect, the present disclosure provides methods for securely distributing resource transfer request data. A resource account management system (RAM system) may implement the disclosed methods when processing a resource transfer request that is submitted by an entity associated with one of the managed accounts. More specifically, a RAM system associated with a transferee of a resource transfer request (or "transferee RAM system") may implement the disclosed methods. Upon receiving a request for transfer of resources, the transferee RAM system generates a secure data object associated with the request. The secure data object includes one or more resource transfer parameters including, at least, account information for a transferee account at the transferee RAM system and a hash computed based on the one or more resource transfer parameters. The secure data object is signed using a private key associated with the transferee RAM system. The signed secure data object is then sent to a messaging address that is associated with a transferor of the requested resources.

In another aspect, the present disclosure provides methods for validating resource transfer request data. A resource account management system (RAM system) may implement the disclosed methods when processing a resource transfer request. More specifically, a RAM system associated with an identified transferor for a resource transfer request (or "transferor RAM system") may implement the disclosed methods. Upon receiving a secure data object associated with a request for transfer of resources, the transferor RAM system validates the secure data object. In particular, the transferor RAM system verifies that a signature associated with the secure data object is valid using a public key corresponding to the private key associated with the transferee RAM system. The transferor RAM system then computes a second hash based on the resource transfer parameters included in the secure data object and compares the second hash to the first hash to confirm that the resource transfer parameters have not been modified since the signing.

FIG. 1 is a schematic diagram illustrating an operating environment of an example embodiment. In particular, FIG. 1 illustrates exemplary components of a system 100 for processing transfers of resources between computing systems. As a specific example, the system 100 may be implemented to facilitate automated processing and handling of requests to transfer funds (e.g. payment transactions, etc.) between resource accounts. More generally, the components of system 100 enable automated processing of resource transfer requests that are directed to resource account management systems.

As illustrated, the resource servers 130a and 130b (which may also be referred to as resource account management systems) and one or more client devices 110 communicate via the network 160. The client device 110 is a computing device. For example, the client device 110 may be a device of an entity having resources that are associated with one of the resource servers (e.g. resource server 130a). The resource servers 130a and 130b may track, manage, and maintain resources, make lending decisions, and/or lend resources for a plurality of clients. The resources may, for example, include computing resources, such as memory or processor cycles. By way of further example, the resources may include stored value, such as fiat currency, which may be represented in one or more databases. For example, as shown in FIG. 1, the resource server 130a may be coupled to a database 140, which may be provided in secure storage. The secure storage may be provided internally within the resource server 130a or externally; the secure storage may, for example, be provided remotely from the resource server 130a. In some embodiments, the secure storage may include one or more data centers. The data centers may, for example, store data with bank-grade security.

The resource servers 130a and 130b may each include a resource request processing engine (not shown in FIG. 1). A resource request processing engine may be implemented to automatically process resource transfer requests that are received at a resource server. More specifically, the resource request processing engine may be configured to process requests to transfer resources that are associated with one or more resource accounts managed by the resource servers. The resource request processing engine may process resource transfer requests in accordance with defined handling actions. In particular, the resource request processing engine may be configured to automatically process resource transfer requests without manual intervention by related entities (e.g. a resource server administrator, clients associated with the resource accounts, etc.) for the resource transfer requests.

The database 140 may include records for a plurality of accounts and at least some of the records may define a quantity of resources associated with an entity. For example, the entity that is associated with the client device 110 may be associated with a resource account having one or more records in the database 140. The records may reflect a quantity of stored resources that are associated with the entity. Such resources may include owned resources and, in at least some embodiments, borrowed resources (e.g. resources available on credit). The quantity of resources that are available to or associated with an entity may be reflected by a balance defined in an associated record such as, for example, a bank balance.

The database 140 may also store transfer configuration rules data comprising rules for handling resource transfer requests that are directed to the resource server 130a. Various transfer configuration rules may be defined for specifying handling actions for automatically processing resource transfer requests to the resource server 130a. Upon receiving a resource transfer request (e.g. from a client device 110, a transfer request issuing server, etc.), the resource server 130a may access the database 140 to identify transfer configuration rules that are relevant to the resource transfer request and determine one or more suitable handling actions based on the identified rules. Additionally, or alternatively, the transfer configuration rules data may be stored externally of the database 140.

The resource servers 130a and 130b may, for example, be financial institution servers and the entity associated with a client device 110 may be a customer of a financial institution operating one of the financial institution servers.

The client device 110 may be used, for example, to configure requests to transfer resources to a resource account associated with the client device 110. More particularly, the client device 110 may be used to generate requests to transfer resources to a resource account associated with an entity operating the client device 110. A resource transfer may, for example, involve a transfer of data between a record in the database 140 associated with an account at the resource server 130a and another record in the database 140 (or in another database, such as a database associated with the resource server 130b). The data involved in the resource transfer may, for example, be units of value and the records involved in the resource transfer may be adjusted in related or corresponding manners. For example, during a resource transfer, a record associated with the resource transfer recipient (i.e., transferee) may be adjusted to reflect an increase in value resulting from the transfer, whereas the record associated with the entity initiating the resource transfer (i.e., transferor) may be adjusted to reflect a decrease in value which is at least as large as the increase in value applied to the record associated with the resource transfer recipient.

The client device 110 and the resource servers 130a and 130b may be in geographically disparate locations. Put differently, the client device 110 may be remote from at least one of the resource servers 130a and 130b.

The client device 110 and the resource servers 130a and 130b are computer systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 160 is a computer network. In some embodiments, the network 160 may be an internetwork such as may be formed of one or more interconnected computer networks. For example, the network 160 may be or may include an Ethernet network, an asynchronous transfer mode (ATM) network, a wireless network, or the like.

In the example of FIG. 1, the resource servers 130a and 130b may provide both resource transfer processing (e.g. electronic fund transfers) and data holding (e.g. banking)

functions. In particular, the resource servers 130a and 130b may be both a financial institution server and also a payment transaction processing server. The resource servers 130a and 130b may, in some embodiments, be a proxy server, serving as an intermediary for requests for client devices 110 seeking resources from other servers.

Figure 2A:
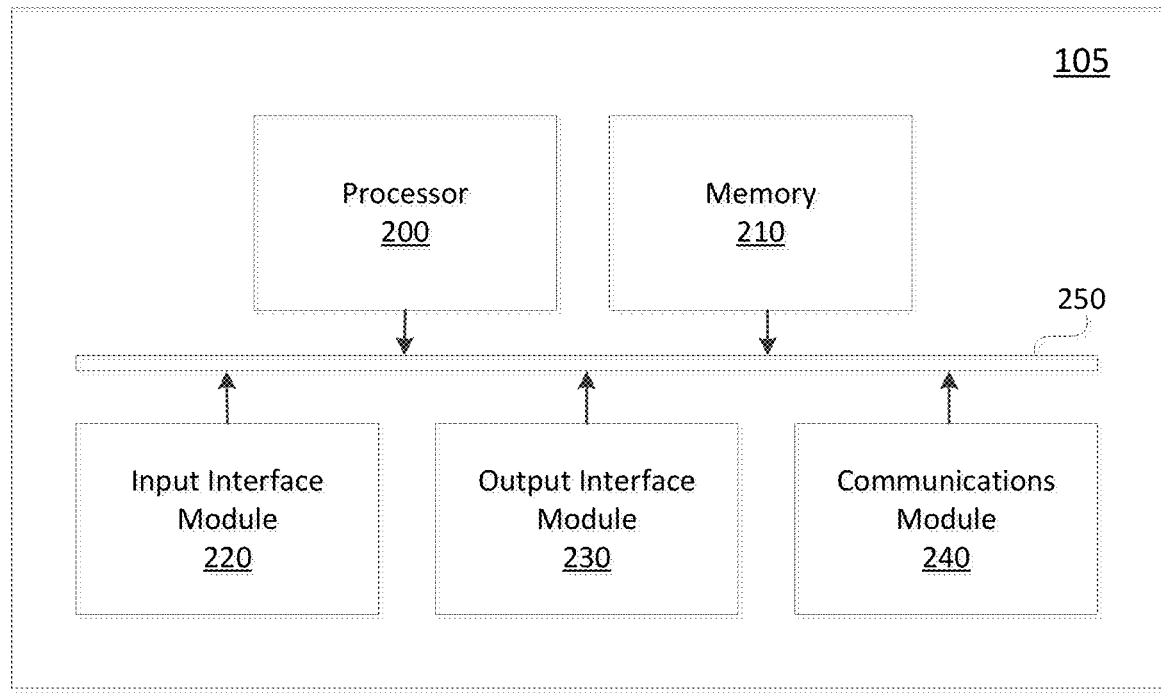
FIG. 2A is high-level schematic diagram of a computing device.

FIG. 2A is a high-level operation diagram of an example computing device 105. In at least some embodiments, the example computing device 105 may be exemplary of one or more of the resource servers 130a and 130b and the client device 110. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
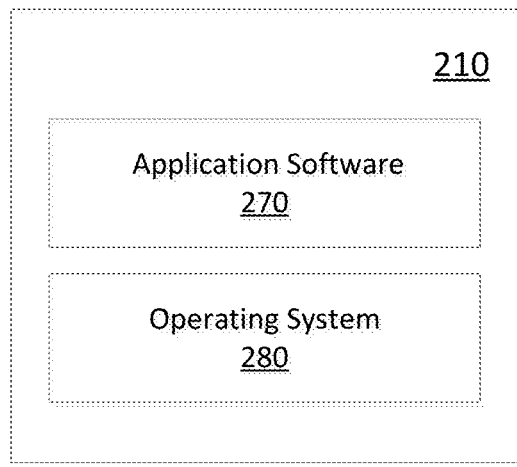
FIG. 2B shows a simplified organization of software components stored in a memory of the computing device of FIG. 2A.

FIG. 2B depicts a simplified organization of software components stored in memory 210 of the example computing device 105. As illustrated, these software components include application software 270 and an operating system 280.

The application software 270 adapts the example computing device 105, in combination with the operating system 280, to operate as a device performing a particular function. In some embodiments, the application software 270 may comprise a resource account management application. The resource account management application may, for example, be a personal banking application that is used to manage one or more banking accounts. The resource account management application may provide various functions such as resource transfers (e.g. electronic fund transfers, etc.), display of account balances, and other account management functions. For example, the resource account management application may enable users to configure requests for transfers of resources to accounts associated with the users. In particular, the resource account management application may be used to generate resource transfer requests. A user may input information, or parameters, for defining a resource transfer request such as the identity of the transferor, quantum of resources requested, and account information for a designated account for receiving the transfer. Once it is defined, the resource transfer request can be transmitted, via the resource account management application, to a computing system for processing resource transfers. For example, the resource transfer request may be transmitted to a resource server managing the account(s) of the requesting entity, and the resource server may subsequently direct the request to a suitable computing system (e.g. resource account management server) that is associated with the identified transferor for the resource transfer request.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

Figure 3:
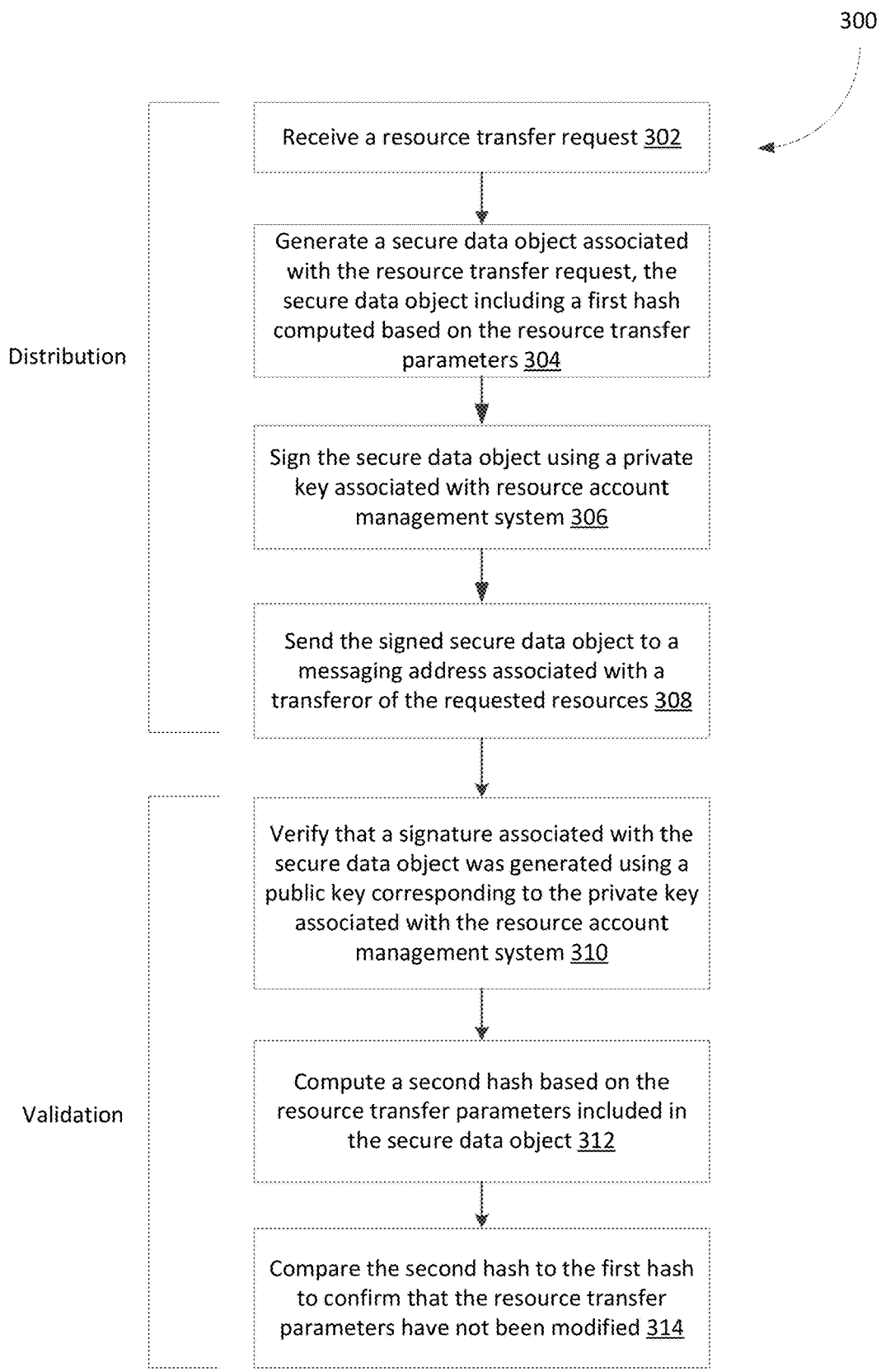
FIG. 3 shows, in flowchart form, an example method for processing a resource transfer request.

Reference is now made to FIG. 3, which shows, in flowchart form, an example method 300 for processing a resource transfer request. The method 300 may be implemented by a resource management system, such as the resource server 130*a* of FIG. 1. More specifically, a computing system that manages resources associated with one or more resource accounts may implement the method 300 as part of its processing of requests to share, distribute, or otherwise transfer resources between resource accounts. The method 300 may be performed by a computing system that manages one or both of a transferee and a transferor account associated with the resource transfer request.

Operations starting with operation 302 and continuing onward are performed by the processor 200 (FIG. 2A) of a computing device 105 executing software comprising instructions such as may be stored in the memory 210 of the computing device 105. For example, the operations of the method 300 may be performed by the resource server 130*a*. More particularly, processor-executable instructions may, when executed, configure a processor 200 of the resource server 130*a* to perform all or parts of the method 300.

In operation 302, the server receives a resource transfer request. The resource transfer request may be received, for example, via a client device associated with a resource account. In particular, the resource transfer request may comprise a request to transfer resources to one of the resource accounts being managed by the server. The information for defining the resource transfer request, or resource transfer parameters, may be input via the client device. A resource transfer request may indicate, at least, an identity of a transferor, contact information (e.g. messaging address) for the transferor, and a quantity of resources that is requested to be transferred. In some embodiments, the server may receive information which may be used for generating a resource transfer request. In particular, rather than receiving a resource transfer request, the server may receive a request to generate a resource transfer request and information for generating the resource transfer request. For example, the server may receive, via a client device, invoice data for an invoice, including information (e.g. invoice identifier, business name, payment amount, description of service, etc.) for generating a request for an electronic fund transfer in connection with the invoice.

In operation 304, the server generates a secure data object associated with the resource transfer request. The secure data object is an object which may be integrated with the resource transfer request or processed independently of the resource transfer request. For example, the server may combine the secure data object with the resource transfer request to generate a modified resource transfer request, and the modified resource transfer request may be transmitted, by the server, to an identified transferor (e.g. a messaging address of the transferor) for the original resource transfer request. Alternatively, the server may transmit the resource transfer request and the secure data object to the transferor—that is, the secure data object may be separate from, and transmitted together with, the resource transfer request. As a further alternative, the server may only transmit the secure data object to the transferor. In particular, the server may process the original resource transfer request to generate a secure data object associated with the resource transfer request, and only the secure data object may be transmitted to the transferor. The secure data object may, for example, include sufficient information for effecting the requested transfer associated with the original resource transfer request.

The secure data object indicates one or more resource transfer parameters associated with the resource transfer request. Specifically, the secure data object indicates account information for an account associated with the transferee at a resource account management system. Upon receiving the resource transfer request, the server obtains the account information, including account number, account owner identifier, an account management server associated with the account, etc., for the transferee resource account, which may be an account that is managed by the server. In addition to the account information, the secure data object may include, without limitation, invoice data (e.g. invoice identifier) for an invoice associated with the resource transfer request, quantum of requested resources (e.g. requested amount of electronic fund transfer), and a description of goods and/or services associated with the invoice data.

In at least some embodiments, the secure data object additionally includes a unique transfer identifier. For example, the transfer identifier may be a randomly generated alphanumeric string (e.g. a code). The transfer identifier may be used for preventing replay attacks in connection with resource transfers. More particularly, the transfer identifier may be uniquely mapped to the resource transfer request such that once the requested transfer is completed, the same resource transfer request may not be resent to the transferor to cause the same transfer to be repeated. For example, as will be further described below, a server may verify that a transfer identifier associated with a resource transfer request has not been used previously prior to processing the requested transfer of resources.

The secure data object may take various forms. The secure data object may, for example, be a message comprising an alphanumeric string. In some embodiments, the secure data object may be encoded into a machine-readable format. For example, the secure data object may be encoded into a barcode, such as a Quick Response (QR) code, or another machine-readable optical label. Additionally, or alternatively, the secure data object may be in a document format, such as portable document format (PDF) or another digitally signed document.

The secure data object also includes a hash of the one or more resource transfer parameters associated with the resource transfer request. In at least some embodiments, the data representing the resource transfer parameters is hashed to produce a message digest. The server may, for example, use a cryptographic hash function that maps a message representing the resource transfer parameters (e.g. a concatenated byte stream comprising the resource transfer parameters) to compute a hash value. The computed hash value is included in the secure data object. The secure data object may also include an indication of the cryptographic hash function that was used for computing the hash value. As will be described below, the computed hash value may be used for protecting the integrity of the contents of the secure data object.

In operation 306, the server signs the secure data object using a private key associated with the server, i.e. a resource account management system. In particular, the server generates a digital signature based on the secure data object and a private key. The secure data object (e.g. a string) may be combined with the private key to create a digital signature for the secure data object. The server may generate a public and private key pair based on an asymmetric cryptographic scheme, such as RSA, elliptic-curve cryptography (ECC), digital signature algorithm (DSA), etc. Alternatively, the server may obtain an asymmetric key pair from a remote key generation system or module. The private key is used by the server to sign the secure data object. The corresponding public key can subsequently be used for verifying the validity of the signature associated with the secure data object, i.e. made by the server. More specifically, a transferor associated with a resource transfer request (or a computing system associated with the transferor) can confirm that the secure data object originated from a server/resource account management system that manages the transferee account, by verifying the signature associated with the secure data object using the public key associated with that server.

In operation 308, the server sends the signed secure data object to the transferor associated with the resource transfer request. For example, the server may send the signed secure data object to a messaging address associated with the transferor. In at least some embodiments, only the signed secure data object may be sent. That is, the original resource transfer request may not itself be transmitted to the transferor. Additionally, or alternatively, the server may generate a modified resource transfer request based on information contained in the original resource transfer request and the signed secure data object, and the modified resource transfer request may be sent to the transferor.

In some embodiments, the server may provide the secure data object to the transferee or requesting entity. The requesting entity can then forward the secure data object on to the transferor by, for example, sending a message to a messaging address for the transferor. That is, rather than the secure data object being transmitted by the server directly to the transferor, the requesting entity can send the secure data object to the transferor. For example, the secure data object may be sent, by the requesting entity to the transferor, as part of a message (or notification, etc.) requesting a transfer of resources.

The transferor may provide the secure data package to a computing system for managing resource accounts. In particular, the transferor may relay the secure data package to a resource account management system, such as resource server 130a or 130b, that manages a resource account associated with the transferor. Where the resource accounts of the transferor and transferee are managed by the same server, the secure data package is sent back to the server that generated it, i.e. the server managing the transferee and transferor accounts. If, on the other hand, the resource accounts of the transferor and transferee are managed by different systems, the secure data package is sent to the resource account management system that manages the transferor's account.

Upon receiving the secure data package, the server associated with the transferor's account attempts to validate the secure data object. In operation 310, the server verifies that the signature associated with the secure data object is valid. In particular, the server uses a public key corresponding to the private key associated with the server/resource account management system that manages the transferee account to verify that the signature is valid. The server obtains information relating to the requested resource transfer such as identity of the requester, transferee account information, resource account management system associated with the transferee account from the secure data package. Based on the information, the server obtains, as part of operation 310, the public asymmetrical key associated with the resource account management system for the transferee. Using this public key, the server can verify whether the signature associated with the received secure data object is valid.

In operation 312, the server generates a second hash of the one or more resource transfer parameters that are included in the secure data object. As described above, the secure data object indicates resource transfer parameters associated with the original resource transfer request and a hash value computed from a message representing the resource transfer parameters. Upon receiving the secure data object, the server may compute a second hash, based on the same cryptographic hash function that was used to compute the first hash, from the resource transfer parameter data included in the secure data object.

In operation 314, the server compares the compute second hash value to the first hash value included in the secure data object to determine whether any of the resource transfer parameters associated with the original resource transfer request have been modified after the signing. If there is a match between the first and second hash values, the server determines that none of the data elements of the secure data object (and more particularly, the resource transfer parameters) were not modified while in transport.

Figure 4:
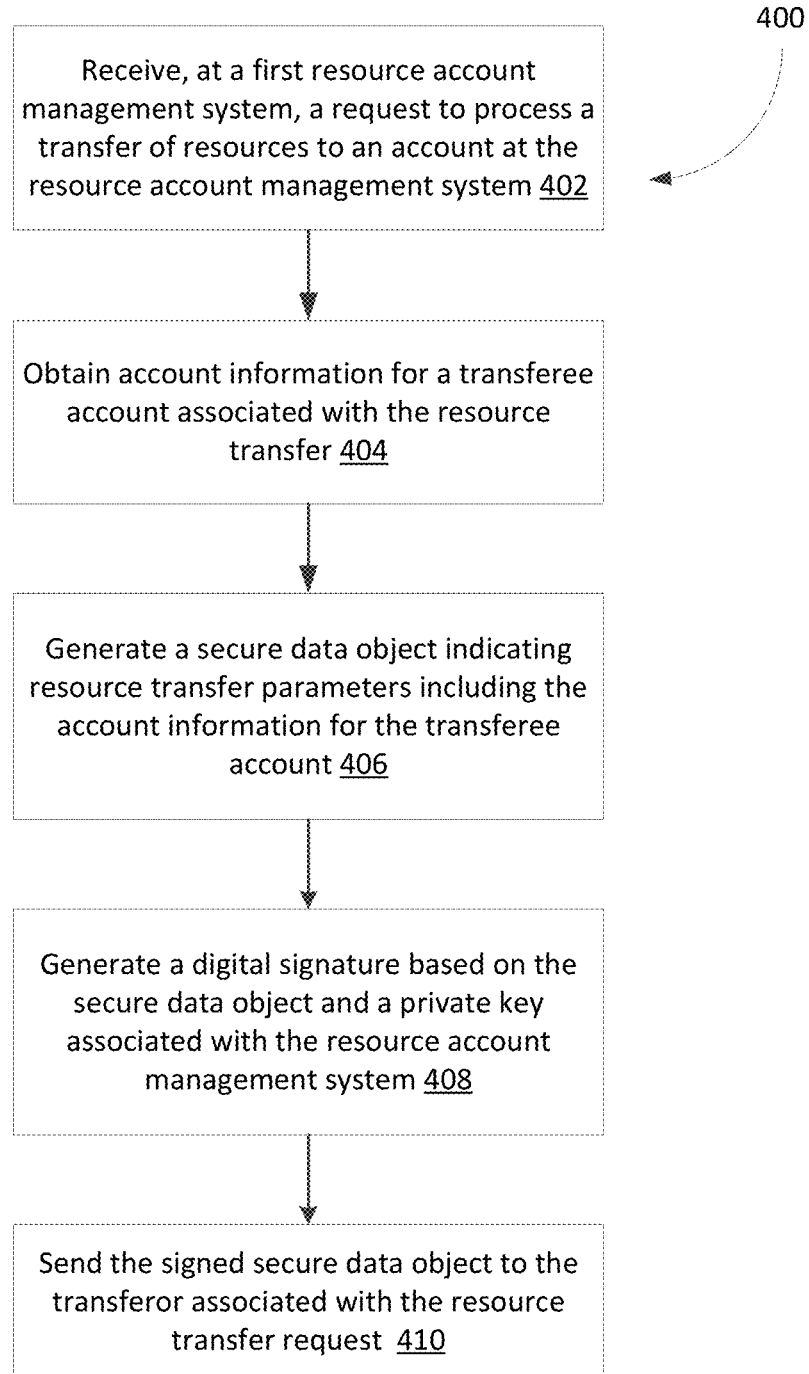
FIG. 4 shows, in flowchart form, an example method for securely distributing resource transfer request data.

The secure distribution and validation of resource transfer request data are further detailed with reference with FIGS. 4 to 6B. FIG. 4 shows, in flowchart form, an example method 400 for securely distributing resource transfer request data. The method 400 may be implemented by a resource management system. More specifically, a system that manages a resource account associated with an identified transferee (or "requester") for a resource transfer may implement the method 400. The operations of method 400 may be performed by the processor 200 (FIG. 2A) of a computing device 105 executing software comprising instructions such as may be stored in the memory 210 of the computing device 105. For example, processor-executable instructions may, when executed, configure a processor 200 associated with a resource account management system (such as the resource server 130a) to perform all or parts of method 400. The operations of method 400 may be performed in addition to, or as alternatives, to one or more of the operations of method 300 of FIG. 3.

In operation 402, the server receives a request to process a transfer of resources to an account that is managed by the server. The request may, for example, be received via a client device associated with one of the resource accounts managed by the server. For example, a user of the client device may identify a resource account (by providing account identifying information, such as account number, login credentials, etc.) that is managed by the server and input a request for resources to be transferred to the identified account. The request may, for example, indicate the identity of a transferor, contact information for the transferor, and a quantum of resources requested to be transferred. In some embodiments, a user may provide, to the server, invoice data for an invoice and submit a request for transfer of resources in connection with the invoice data. Based on the invoice data, the server may generate a resource transfer request for a specific transferor entity. For example, the server may perform digital document processing operations (e.g. optical character recognition (OCR), etc.) on the invoice to extract relevant data for generating a resource transfer request.

In operation 404, the server obtains account information for a transferee account associated with the resource transfer. In particular, the server ascertains account identifying information such as account number, account owner identifier, etc. for a resource account, managed by the server, that is associated with the requesting entity for the resource transfer. In at least some embodiments, the server may verify the information contained in the original resource transfer request with the account identifying information for the transferee account. For example, the server may perform a comparison of the name associated with the account number that is on file at the server with identifying information for the transferee/requester that is included in the original resource transfer request. In this way, the server may verify that a transfer requesting entity, as identified in the resource transfer request, is associated with a resource account having a defined account number at the server.

In operation 406, the server generates a secure data object associated with the resource transfer request. The secure data object indicates one or more resource transfer parameters (e.g. invoice identifier, requested quantum of resources, identifying information for the transferee, etc.) and, in particular, includes the account information for the transferee account. The secure data object may, in some embodiments, include a unique transfer identifier, which may be an alphanumeric string or code. The secure data object also includes a hash value that is computed based on the resource transfer parameters including the unique transfer identifier. That is, the server may compute a hash based on contents of the secure data object (e.g. a concatenated byte stream comprising the data items included in the secure data object) using a cryptographic hash function, and the computed hash is included in the secure data object.

In operation 408, the server signs the secure data object. More specifically, the server combines the secure data object with a private key associated with the server to generate a digital signature for the secure data object. The private key may be generated, by the server, as part of an asymmetrical key pair, or obtained by the server from a remote key generation system/module. In operation 410, the server sends the signed secure data object to the transferor associated with the resource transfer request. For example, the secure data object and the digital signature associated with the secure data object may be sent to a messaging address for the transferor.

Figure 5:
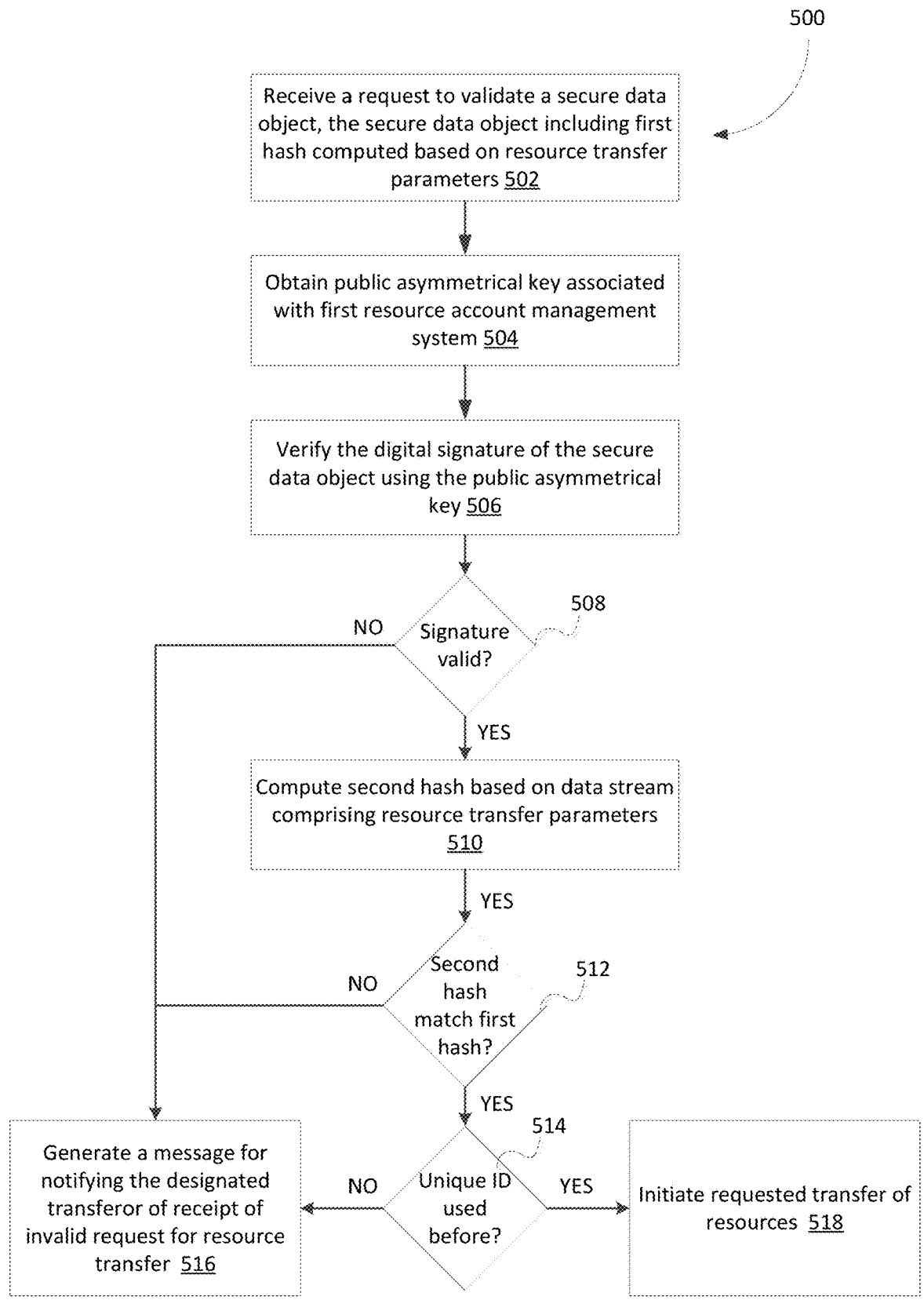
FIG. 5 shows, in flowchart form, an example method for validating resource transfer request data.

Reference is now made to FIG. 5, which shows, in flowchart form, an example method 500 for securely distributing resource transfer request data. The method 500 may be implemented by a resource management system. More specifically, a system that manages a resource account associated with an identified transferor for a resource transfer may implement the method 500. The operations of method 500 may be performed by the processor 200 (FIG. 2A) of a computing device 105 executing software comprising instructions such as may be stored in the memory 210 of the computing device 105. For example, processor-executable instructions may, when executed, configure a processor 200 of a resource account management system (such as the resource server 130*b*) to perform all or parts of method 500. The operations of method 500 may be performed in addition to, or as alternatives, to one or more of the operations of method 300 of FIG. 3 and method 400 of FIG. 4.

A server that implements the methods of the present disclosure may be configured to check for a secure data object each time a resource transfer request is received. That is, upon receiving a request for resources to be transferred from an account managed by the server, the server may check for a secure data object associated with the resource transfer request. The server may not process a resource transfer request until an associated secure data object is received and validated.

In operation 502, the server receives a request to validate a secure data object associated with a resource transfer request. That is, the server receives a data object that contains information, including resource transfer parameters, associated with a resource transfer request. The data object is secured through use of, for example, a hash value computed based on the resource transfer parameters, inclusion of a unique transfer request, and by a digital signature generated using a private key associated with a resource account management system for the transferee (the "transferee account management system") of the requested resource transfer. The secure data object may be received from an identified transferor for the resource transfer. For example, the secure data object may be relayed by the identified transferor after having received it from the transferee or the transferee account management system.

In operation 504, the server obtains a public asymmetrical key for the transferee account management system. In some embodiments, the public key may be obtained by the server directly from the transferee account management system. For example, the server may determine an identity of the transferee account management system, based on the information contained in the secure data object, and transmit a request to the transferee account management system obtain its public key used in generating the secure data object. In other embodiments, the server may obtain the public key from an independent key generation system/module. That is, the server may request to obtain, from a remote key generation system, a public key associated with the transferee account management system by providing identification information for the transferee account management system.

In operation 506, the server verifies the digital signature associated with the secure data object using the obtained public key. The server determines whether the digital signature is valid, in operation 508. If the verification fails, the server may determine that the secure data object was not sent by the transferee account management system or that the secure data object generated by the transferee account management system was tampered with during transport. The server rejects the associated resource transfer request. In some embodiments, the server may generate a message for notifying the transferor of receipt of an invalid resource transfer request, in operation 516. For example, a notification indicating that the resource transfer request data was not validated may be sent to the transferor. A message may optionally be sent to the transferee account management system that the resource transfer request was rejected for failure of the secure data object being validated.

If, on the other hand, the digital signature is determined to be valid, the server proceeds to compute a hash of the data content of the secure data package, in operation 510. In particular, a second hash is computed based on resource transfer parameters that are indicated in the secure data package. For example, the second hash may be computed based on a data stream comprising the resource transfer parameters. The second hash is computed using the same cryptographic hash function that was used for computing a first hash included in the secure data package. The server compares the computed second hash value with the first hash, in operation 512. If the first and second hash values do not match, the server may determine that one or more of the data elements of the secure data object was modified after signing of the secure data object. The server rejects the associated resource transfer request and may generate a message for notifying the transferor of receipt of an invalid resource transfer request, in operation 516.

Figure 6A:
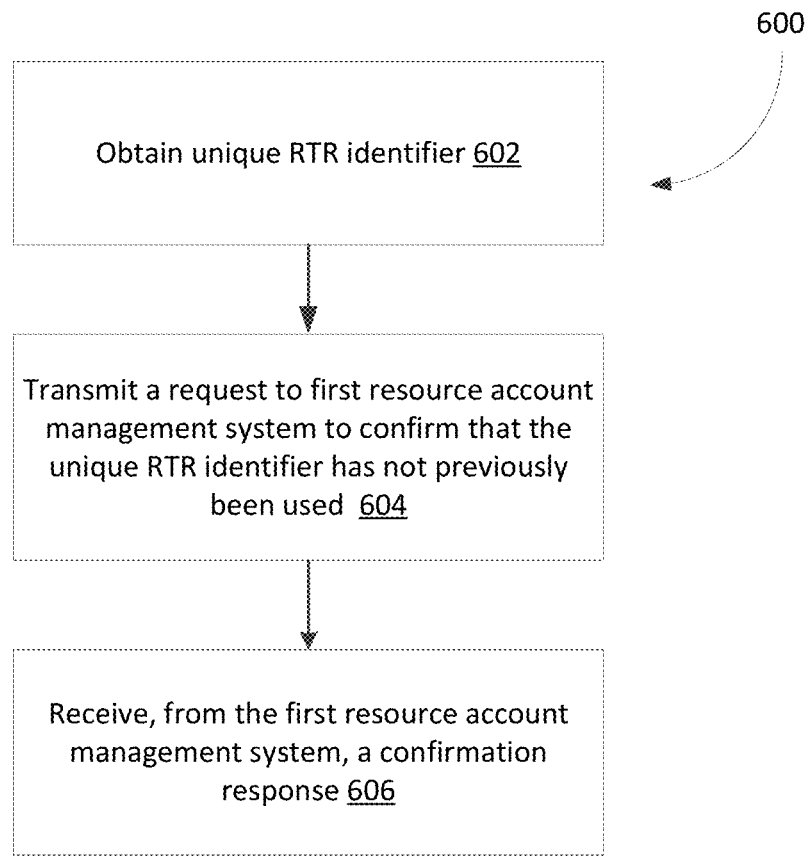
FIG. 6A shows, in flowchart form, an example method for validating a unique transfer identifier associated with a resource transfer request.
Figure 6B:
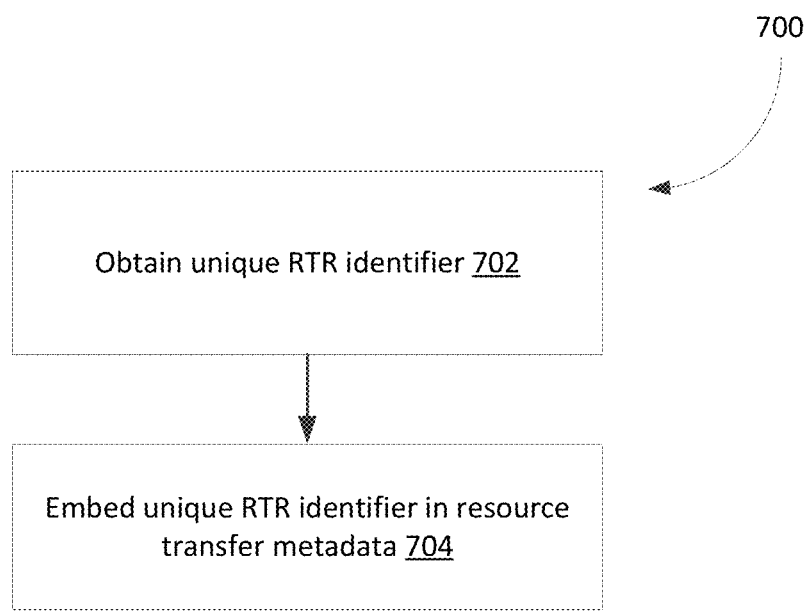
FIG. 6B shows, in flowchart form, another example method for validating a unique transfer identifier associated with a resource transfer request.

If, in operation 512, the computed second hash value is determined to match the first hash value, the server proceeds to determine whether the unique identifier associated with the resource transfer request had previously been used, in operation 514. FIGS. 6A and 6B show example methods 600 and 700, respectively, for validating a transfer identifier associated with a resource transfer request. The methods 600 and 700 may be implemented by a resource management system, such as the resource server 130*a* or 130*b* of FIG. 1. The operations of methods 600 and 700 may be performed as part of a process for validating resource transfer request data. In particular, the methods 600 and 700 may be implemented as subprocesses of method 500 of FIG. 5.

In the method 600, the server requests the transferee account management system to confirm that the unique transfer identifier has not previously been used for any transfers (e.g. using an application programming interface (API)). In operation 602, the server obtains the unique transfer identifier (such as a real-time rail, or RTR, identifier in the case of real-time electronic fund transfers) from the secure data object. The server transmits a request to the transferee account management system to confirm that the unique transfer identifier has not been previously used for transfers, in operation 604. The transferee account management system may query one or more database containing resource transfer data for the accounts managed by the system and provide a response to the request from the server. The server receives the response, in operation 606, which confirms whether or not the unique transfer identifier was used in association with a previous transfer.

Returning to FIG. 5, if the response received by the server indicates that the unique transfer identifier was not previously used, the server may cause the requested transfer of resources to be initiated, in operation 518. The server configures a transfer of the requested resources to the transferee account identified by the account information. For example, the server may generate a request to a clearing house system to process a resource transfer (e.g. electronic fund transfer) using a real-time resource transfer rail in accordance with the resource transfer parameters indicated in the secure data object. If, however, the received response indicates that the unique transfer identifier was previously used in association with a transfer, the server may determine that the requested transfer is valid. In particular, the server may detect that a replay attack has been attempted. The server rejects the associated resource transfer request and may generate a message for notifying the transferor of receipt of an invalid resource transfer request, in operation 516.

Alternatively, in some embodiments, the server may validate the unique transfer identifier in accordance with method 700. According to method 700, the server may cause the requested resource transfer to be processed and embed the unique transfer identifier in the resource transfer details. In operation 702, the server obtains the unique transfer identifier (e.g. a unique RTR identifier). The server embeds the unique transfer identifier in metadata associated with the requested resource transfer, in operation 704. In this alternative scheme, the transferee account management system is relied on to accept or reject the resource transfer based on verification of whether the unique transfer identifier was previously used. Upon receiving the resource transfer, the transferee account management system checks the metadata associated with the resource transfer to obtain the embedded unique transfer identifier. The transferee account management system then verifies whether said identifier has been used before in association with transfers to or from accounts that are managed by the transferee account management system. If the identifier was previously used, the transferee account management system may reject the resource transfer, i.e. abandon the transfer of resources to the transferee/requester account.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A computing device, comprising:
a processor; and
a memory coupled to the processor, the memory storing computer-executable instructions that, when executed by the processor, configure the processor to:
receive, via a client device, a resource transfer request from a transferee for resources to be transferred from a transferor account to a transferee account;
generate a secure data object for forwarding to a transferor associated with the transferor account based on request data of the resource transfer request, the secure data object indicating one or more resource transfer parameters including account information for the transferee account, wherein the secure data object includes a first hash computed based on an input string concatenating at least a unique transfer identifier and a transferee account identifier;
sign the secure data object using a private key of a transferee resource account management system; and
send the signed secure data object to a messaging address of the transferor associated with the transferor account.

2. The computing device of claim 1, wherein the instructions, when executed, further configure the processor to:
validate the secure data object by:
verifying that a signature associated with the secure data object is valid using a public key corresponding to the private key of the transferee resource account management system; and
computing a second hash based on the one or more resource transfer parameters included in the secure data object and comparing the second hash to the first hash to confirm that the one or more resource transfer parameters have not been modified after the signing.

3. The computing device of claim 2, wherein validating the secure data object further comprises confirming that a unique identifier included in the secure data object has not been used previously.

4. The computing device of claim 3, wherein confirming that the unique identifier has not been used previously comprises sending a request to the transferee resource account management system to confirm that no resource transfers to accounts at the transferee resource account management system have been processed using the unique identifier.

5. The computing device of claim 2, wherein the instructions, when executed, further configure the processor to:
after verifying that the signature associated with the secure data object is valid, configure a transfer of the requested resources from the transferor account to the transferee account identified by the account information using a real-time resource transfer rail.

6. The computing device of claim 5, wherein the secure data object indicates a quantity of resources associated with the resource transfer and wherein configuring the transfer comprises configuring a transfer of the quantity of resources identified in the secure data object.

7. The computing device of claim 5, wherein the secure data object includes a unique identifier and wherein configuring the transfer comprises embedding the unique identifier in transfer data associated with the resource transfer.

8. The computing device of claim 5, wherein the instructions, when executed, further configure the processor to provide, to a computing device associated with the transferor, identification information for a transferee that is identified in the secure data object.

9. The computing device of claim 1, wherein the secure data object includes a unique identifier and wherein the first hash is computed based, in part, on the unique identifier.

10. The computing device of claim 1, wherein generating the secure data object comprises obtaining the account information for the transferee account directly from the transferee resource account management system.

11. A computer-implemented method, comprising:
receiving, via a client device, a resource transfer request from a transferee for resources to be transferred from a transferor account to a transferee account;
generating a secure data object for forwarding to a transferor associated with the transferor account based on request data of the resource transfer request, the secure data object indicating one or more resource transfer parameters including account information for the transferee account, wherein the secure data object includes a first hash computed based on an input string concatenating at least a unique transfer identifier and a transferee account identifier;
signing the secure data object using a private key of a transferee resource account management system; and
sending the signed secure data object to a messaging address of a transferor associated with the transferor account.

12. The method of claim 11, further comprising:
validating the secure data object by:
verifying that a signature associated with the secure data object is valid using a public key corresponding to the private key of the transferee resource account management system; and
computing a second hash based on the one or more resource transfer parameters included in the secure data object and comparing the second hash to the first hash to confirm that the one or more resource transfer parameters have not been modified after the signing.

13. The method of claim 12, wherein validating the secure data object further comprises confirming that a unique identifier included in the secure data object has not been used previously.

14. The method of claim 13, wherein confirming that the unique identifier has not been used previously comprises sending a request to the transferee resource account management system to confirm that no resource transfers to accounts at the transferee resource account management system have been processed using the unique identifier.

15. The method of claim 12, further comprising:
after verifying that the signature associated with the secure data object is valid, configure a transfer of the requested resources from the transferor account to the transferee account identified by the account information using a real-time resource transfer rail.

16. The method of claim 15, wherein the secure data object indicates a quantity of resources associated with the resource transfer and wherein configuring the transfer comprises configuring a transfer of the quantity of resources identified in the secure data object.

17. The method of claim 15, wherein the secure data object includes a unique identifier and wherein configuring the transfer comprises embedding the unique identifier in transfer data associated with the resource transfer.

18. The method of claim 11, wherein the secure data object includes a unique identifier and wherein the first hash is computed based, in part, on the unique identifier.

19. The method of claim 11, wherein generating the secure data object comprises obtaining the account information for the transferee account directly from the transferee resource account management system.

20. A computer-implemented method, comprising:
at a transferee resource account management system:
generating a secure data object for forwarding to a transferor associated with the transferor account based on request data of a resource transfer request for resources to be transferred from a transferor account to a transferee account at the first resource account management system, the secure data object indicating one or more resource transfer parameters including account information for the transferee account, wherein the secure data object includes a first hash computed based on an input string concatenating at least a unique transfer identifier and a transferee account identifier;
signing the secure data object using a private key of the first resource account management system; and
sending the secure data object to a messaging address of a transferor associated with the transferor account;
at a transferor resource account management system:
validating the secure data object by:
verifying that a signature associated with the secure data object is valid using a public key corresponding to the private key of the first resource account management system; and
computing a second hash based on the one or more resource transfer parameters included in the secure data object and comparing the second hash to the first hash to confirm that the one or more resource transfer parameters have not been modified after the signing.

* * * * *